Patented Apr. 24, 1934

1,955,734

UNITED STATES PATENT OFFICE 1,955,734

PRESERVING THE NATURAL FLAVOR AND DESIRED MOISTURE CONTENT IN BRAZIL NUTS

James Eustace Bizzell, Newark, and Carey K. Bizzell, Elizabeth, N. J.

No Drawing. Application September 12, 1932, Serial No. 632,862

4 Claims. (Cl. 99—81)

When a Brazil nut is brought in contact with the air it gives up fairly rapidly its natural flavor and moisture, thus becoming somewhat tasteless and brittle.

The object of our invention is to retain the desired moisture and delicate flavor of the Brazil nut shelled or unshelled. We have found this is accomplished by applying a solution of glycerine and water to the nut. For example, we have obtained satisfactory results by applying a solution of 80% water and 20% glycerine and then dehydrating to the point desired. We do not confine ourselves to this ratio for the solution, which may be applied under increased pressure, ordinary pressure, or reduced pressure.

We claim:

1. The process of treating Brazil nuts for the purpose of retaining the desired flavor and moisture content, consisting in applying to the nut a solution of glycerine in water and dehydrating to the point desired.

2. The process of treating Brazil nuts for the purpose of retaining the desired flavor and moisture content, consisting in applying to the nut a solution of glycerine in water under ordinary pressure and dehydrating to the point desired.

3. The process of treating Brazil nuts for the purpose of retaining the desired flavor and moisture content, consisting in applying to the nut a solution of glycerine in water under increased pressure and dehydrating to the point desired.

4. The process of treating Brazil nuts for the purpose of retaining the desired flavor and moisture content, consisting in applying to the nut a solution of glycerine in water under reduced pressure and dehydrating to the point desired.

J. EUSTACE BIZZELL.
CAREY K. BIZZELL.